March 13, 1962 W. J. ROSS 3,024,737
APPARATUS FOR CONTROLLING THE FLOW OF LIQUIDS
Filed Feb. 18, 1960
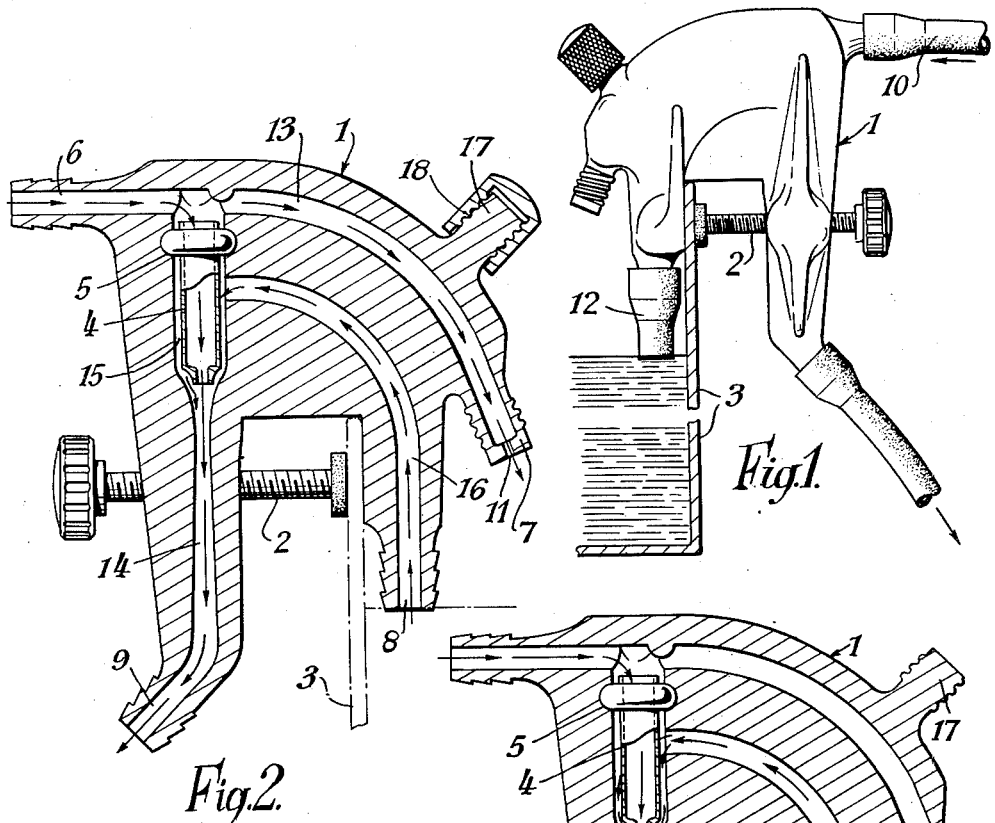
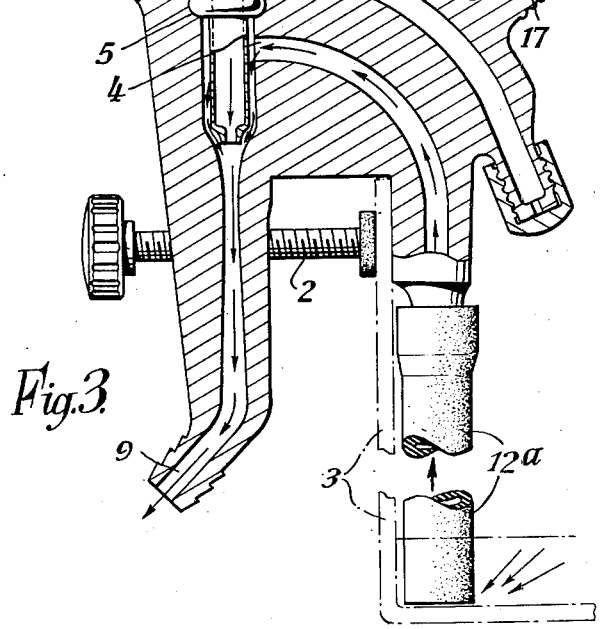
INVENTOR
WILLIAM JOHN ROSS
BY *Greene, Pueler & Durr*
ATTORNEY

United States Patent Office 3,024,737
Patented Mar. 13, 1962

3,024,737
APPARATUS FOR CONTROLLING THE FLOW OF LIQUIDS
William John Ross, Duxford, Cambridge, England, assignor to Techne (Cambridge) Limited, Duxford, Cambridge, England, a British company
Filed Feb. 18, 1960, Ser. No. 9,607
Claims priority, application Great Britain Mar. 17, 1959
5 Claims. (Cl. 103—262)

The apparatus for controlling the flow of fluids forming the subject of the present invention is suitable for use generally where it is desired to keep the level of a liquid in a container constant and where hitherto difficulties have been experienced in emptying the container when required.

The invention is, however, particularly applicable to water baths as used in laboratories where it is difficult to provide a tap at the lower end of the bath, and almost impossible in the case of glass water baths, and where difficulties have hitherto been experienced in topping up such baths to compensate for liquid loss due to evaporation.

The chief object of the invention is to evolve a unit which can be detachably or permanently associated with a water bath or other liquid container which will overcome to a very big extent the difficulties previously experienced.

A unit in accordance with the present invention includes an aspirator type liquid pump having a connection for attachment to a source of liquid pressure supply, a discharge branch connection for dipping into the water bath or other liquid container to a predetermined extent, up which, liquid can be extracted by means of the pump until the liquid falls below the level of the branch connection, and a further branch connection having a supply nozzle through which liquid can be delivered from the source of supply to top up the liquid level as and when required.

Referring to the accompanying drawings:

FIGURE 1 is a side elevation of the unit in position upon the side of a liquid container.

FIGURES 2 and 3 are longitudinal sections through the unit.

Although the unit may be constructed in any suitable way and from any suitable material it is proposed in the ensuing description to describe a unit which is produced in two halves by means of a casting process, the two halves being united together by suitable securing screws, suitable sealing means being interposed between the two halves where necessary.

The unit indicated generally by reference numeral 1 preferably has the general shape shown, the unit being fitted with a screw clamp 2 by means of which it may be mounted on the side of a water bath or other liquid container 3.

The unit contains an injector nozzle 4 located within oppositely positioned recesses 5 in the halves of the unit when they are secured together.

The unit has four branch connections 6, 7, 8 and 9. Connection 6 is intended for connection with a tap or other source of liquid pressure supply by means of a flexible hose 10. Connection 7 takes the form of a small diameter orifice 11 or nozzle and is used for a trickle feed for topping up the level of the liquid in the water bath or other vessel. Connection 8 dips down into the liquid within the vessel and may carry a flexible hose 12 and is provided to maintain the level of the liquid constant in a manner hereinafter described and also alternatively for emptying the vessel. Connection 9 is the usual connection to drain, to complete the desired aspirator effect and a flow of liquid through connection 8 in the direction of the arrows.

Referring now particularly to FIGURE 2 it will be seen that if connection 6 is in communication with a tap or other source of liquid pressure supply, some of the liquid will flow along passageway 13 to the nozzle 11 to top up the level of liquid within the vessel, whilst the remainder will pass through the injector nozzle 4 and to drain via passageway 14 and connection 9, thus setting up a reduction in pressure in the free space 15 immediately surrounding the injector nozzle 4 to cause liquid to be drawn from the vessel through connection 8 and up the passageway 16 to mingle with the liquid in passageway 14 passing to drain.

It will be appreciated that if connection 8 or its flexible hose extension 12 is below the level of the liquid, liquid will continue to be drawn upwardly into passageway 16 but once the liquid level drops to expose the lower end of connection 8 or hose 12 no further liquid will be drawn up until the liquid level once again covers the orifice in connection 8 or hose 12 as a result of liquid entering by way of nozzle 11. The diameter of nozzle 11 will of course be quite small and consequently there will be no risk of liquid entering the vessel faster than it can be withdrawn. In this way the liquid level can be maintained constant, the depth of liquid in the container being virtually dependent upon the effective length of the hose 12.

As will be seen clearly from FIGURE 2 the unit has a screw threaded branch 17 which carries a removable cap 18. If it is desired to empty the liquid, cap 18 is removed and placed in position on threaded connection 7 to close the orifice 11 as in FIGURE 3. A flexible hose 12a is then placed on connection 8 leading down to the bottom of the vessel. The full injector effect will then be obtained to draw liquid upwardly from the bottom of the vessel through connection 8 to drain until the vessel has been completely emptied.

It will be appreciated that the trickle feed to the bath from the connection 8 in addition to replenishing the bath will serve to reduce its temperature if it is desired to operate the bath below ambient.

Such a unit as has been hereinbefore described can easily be clamped to the edge or rim of a glass or other water bath or liquid container without damaging the bath in any way, and in addition to maintaining the liquid at a constant level avoids the fitting of a special valve controlled outlet for emptying purposes, the fitting operating off a normal water tap.

I claim:

1. Apparatus for controlling the flow of liquids, said apparatus consisting of a unit adapted to be positioned in the wall of a bath for holding liquids so that a first side of the unit is over the inside of the bath and the second side of said unit is outside of said bath,
   coupling means including an internal passageway on said second side for coupling the unit to a source of liquid pressure supply,
   said first side including two separate internal passageways with orifices at the end thereof opening toward said bath,
   said second side of said unit containing an internal, generally downwardly directed, passageway connecting with the passageway of said coupling means,
   aspirator means in said last named, downwardly directed passageway including an injector nozzle and a space for reduced pressure at least partially surrounding the injector nozzle,
   the first of said passageways on the first side of said unit being connected to the passageway of said coupling means, the second of said passageways on the first side of said unit being connected to the space for reduced pressure of said aspirator means.

2. The apparatus as claimed in claim 1 wherein the first of said passageways on the first side of said unit comprises a region with an opening which is relatively small compared to the opening of the second of said passageways.

3. The apparatus as claimed in claim 1, wherein the region of the unit surrounding the end of the first passageway of the first side comprises cap retaining means, and cap means adapted to fit said cap retaining means and thereby close the end of said first passageway.

4. The apparatus as claimed in claim 1 comprising clamp means for mounting the unit on the wall of a bath for holding liquids.

5. The apparatus as claimed in claim 1, wherein said unit is formed of two halves and an aspirator means, said aspirator means being formed with an enlarged region, each of said halves including matching recesses to form said passageways, said recesses including an enlarged portion for properly positioning the aspirator means between the halves.

References Cited in the file of this patent
UNITED STATES PATENTS

| | | |
|---|---|---|
| 1,661,002 | McClymont | Feb. 28, 1928 |
| 1,826,829 | Scott | Oct. 13, 1931 |